United States Patent [19]

Henderson

[11] 4,398,202
[45] Aug. 9, 1983

[54] WRITING DEVICES FOR PLOTTING AND RECORDING APPARATUS

[75] Inventor: Kenneth J. Henderson, Crowthorne, England

[73] Assignee: Bryans Southern Instruments Ltd., Mitcham, England

[21] Appl. No.: 339,639

[22] Filed: Jan. 15, 1982

[30] Foreign Application Priority Data

Jan. 15, 1981 [GB] United Kingdom ............... 8101182

[51] Int. Cl.³ ............................................. G01D 9/28
[52] U.S. Cl. ........................................ 346/29; 346/49
[58] Field of Search ..................... 346/29, 35, 49, 140

[56] References Cited

U.S. PATENT DOCUMENTS

| 3,624,659 | 11/1971 | Paine et al. | 346/29 X |
| 4,164,744 | 8/1979 | Freude | 346/140 A |
| 4,186,404 | 1/1980 | Guyot et al. | 346/29 |
| 4,299,031 | 11/1981 | Collins et al. | 346/49 X |

Primary Examiner—Donald A. Griffin
Attorney, Agent, or Firm—Lilling & Greenspan

[57] ABSTRACT

A recording or plotting apparatus has a writing device which comprises a pen holder carrying a plurality of pens. A penholder assembly is movable from end to end of a gantry which is itself movable across a record surface such as a record sheet or card along an axis perpendicular to the axis of movement of the pen holder. Thus, for example, the gantry can move in an X-axis and the penholder can move in a Y-axis. The pen holder is provided with a plurality of writing tips supported in a rotatable turret. The turret is rotated by rotation of a ratchet provided with a plurality of ratchet teeth. The ratchet and therefore the turret is rotated when, in response to movement of the gantry or pen holder, a pawl is engaged with one of the ratchet teeth. When the gantry or pen holder is moved to disengage the pawl from the ratchet tooth the ratchet, and therefore the turret, is rotated, for example, by a defined angle of about 60°, to place a desired one of the pen tips in contact with the record surfaces.

8 Claims, 2 Drawing Figures

WRITING DEVICES FOR PLOTTING AND RECORDING APPARATUS

BACKGROUND OF THE INVENTION

1. Field of the Invention

This invention relates to a plotting or recording apparatus.

2. Description of Prior Art

In a well known type of plotting or recording apparatus, a pen is moved across a record surface such as a sheet of paper or a record card to make a plot or record on the record surface. The pen is carried by a gantry which enables the pen to be moved across and in contact with the record surface. The gantry is usually moved from side to side of the record surface, i.e. on the so-called "X" axis. The pen is carried in a pen-holder which is movable along the gantry in a direction perpendicular to the direction of movement of the gantry, i.e. along the so-called "Y" axis. The movement of the gantry and the penholder are controlled by commands emanating from a data input, e.g. a computer.

SUMMARY OF THE INVENTION

An object of the invention is to provide an improved writing device for such an apparatus. Accordingly, the present invention provides a recording or plotting apparatus comprising a penholder mounted on a gantry which is movable across a record surface along a first axis, the penholder being movable with respect to the gantry along a second axis perpendicular to the first axis. The penholder is mounted on the gantry for rotation into a plurality of writing stations and carries a plurality of writing tips, a respective one of which is placed in a writing position when the penholder is at one of the writing stations. Means operable by movement of the gantry or of the penholder are also provided for rotating the penholder from one writing station to another.

BRIEF DESCRIPTION OF THE DRAWINGS

The invention is illustrated in the accompanying schematic drawings in which.

DESCRIPTION OF THE PREFERRED EMBODIMENTS

Figure 1:
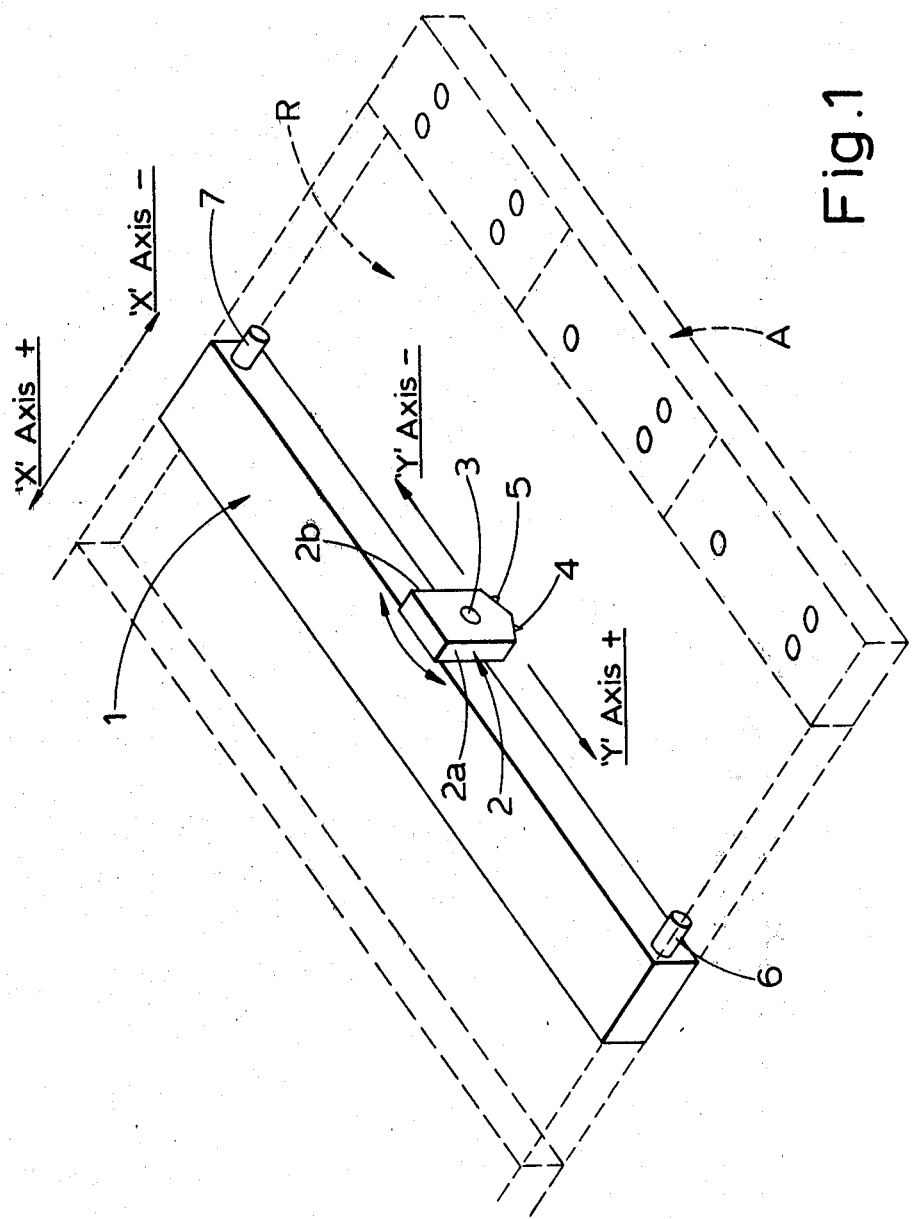
FIG. 1 is a diagrammatic perspective view of a writing device for recording and plotting apparatus, the writing device carrying two writing or pen tips.

In the embodiment of the invention illustrated in FIG. 1, a writing device for a plotting or recording apparatus comprises a gantry 1 which is movable by actuator means A across a record surface R from side to side of the surface, i.e. is movable along the so-called "X" axis as illustrated by the arrow. The gantry 1 carries a penholder 2 which is movable along the gantry 1 from end to end of the gantry, i.e. it is movable across the record sheet along the so-called "Y" axis. Actuation means A are provided to move the gantry 1 and the penholder 2 in the X- and Y-axis respectively. The penholder 2 is not only movable from end to end of the gantry 1, but can also rotated about a pivot 3. The arrangement is such that the penholder can be rotated into either one of two angular positions or writing stations, in each of which a pen tip 4 or 5 is in contact with a record surface not shown. Conveniently, the pens 4 and 5 are arranged to apply ink of a different colour. Actuator pins 6 and 7 are positioned at each end of the gantry 1. When the penholder 2 has completed its movement along the "Y" axis in one direction, a cam surface 2a, 2b of the penholder 2 will hit the appropriate actuator pin 6 or 7. When the penholder 2 hits one of the actuator pins 6 or 7, it will be swung about its pivot 3 from one writing station to another. This will obviously position one of the pen tips in the writing position, for example, when the penholder 2 hits the actuator pin 6, the pen 4 is placed in the writing position.

Figure 2:
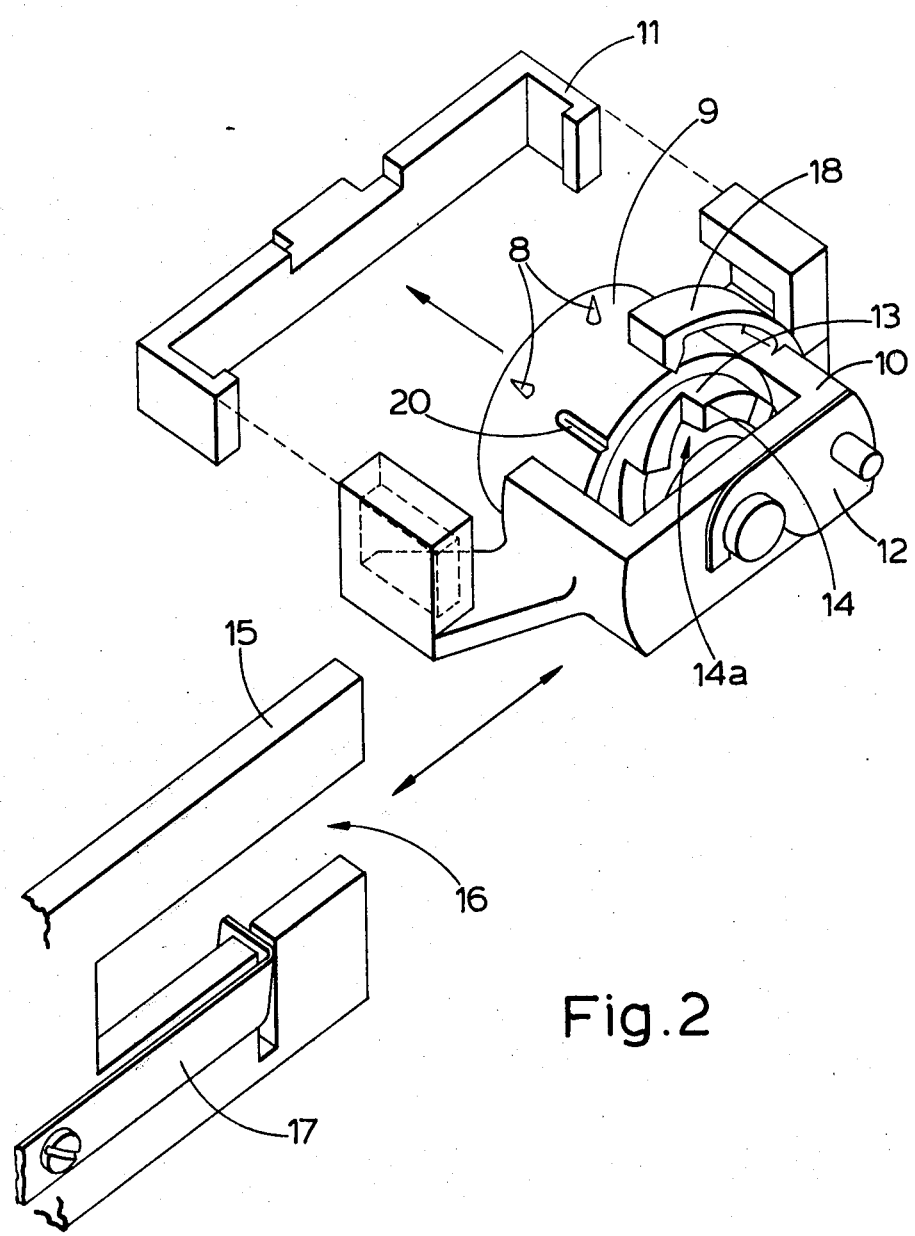
FIG. 2 is a schematic perspective view of a device carrying more than two writing tips.

FIG. 2 illustrates a multi-pen unit. In this embodiment a plurality of pen tips 8, only two of which are visible in the drawing, is mounted in a rotatable turret 9 of a penholder assembly 10. The penholder assembly 10 can be removably fitted in a penholder mounting 11 and retained therein in any suitable way as by friction. The rotatable turret 9 is held in position in the pen assembly by a swing clip 12. The penholder mounting 11 is fitted to a gantry (not shown) so that it can move with the gantry in either direction along the "X" axis. The penholder is also movable with respect to the gantry in both directions along the so-called "Y" axis.

The turret 9 is associated with a ratchet 13 which is rotatable as hereinafter described in order to rotate the turret 9 into any one of a plurality of writing stations, in each of which one of the pen tips 8 is in a writing position. The ratchet 13 has ratchet teeth 14 providing a cam surface 14a. A receptor 15 which is fixed at any convenient position on the plotting or recording apparatus, conveniently to one side of the recording surface, is engageable by the pen assembly 10. The receptor 15 has a slot 16. On receipt of an appropriate command, the pen assembly 10 is advanced in the "Y" direction into the slot 16. A spring pawl 17 in the slot 16 engages with the lower ratchet tooth 14 of the ratchet 13 when the pen assembly is moved into the slot 16. The direction of movement of the pen assembly 10 is then reversed so that it moves in the opposite direction along the "Y" axis and, because the pawl 17 has lodged behind a ratchet tooth, the pawl will rotate the ratchet 13 by a defined angle of, for example, about 60° until the pawl is clear of the tooth 14, thereby bringing the next pen tip into the writing station and in contact with the record surface. A locator spring 18 will in this position move into one of a plurality of detents 20 on the pen assembly to retain the turret in its correct angular position.

When it is desired to change the writing tip in contact with the record surface the same procedure is repeated.

What is claimed is:

1. A recording or plotting apparatus comprising a gantry which is movable across a record surface along a first axis; a pen holder mounted on the gantry for movement with respect to the gantry along a second axis perpendicular to the first axis and for rotation into a plurality of writing stations; a plurality of writing tips mounted on said penholder, a respective one of which is placed in a writing position when the pen holder is at one of the writing stations; actuation means for moving said gantry and said penholder along said first and second axis respectively; and means located on said apparatus and operable by movement of the gantry or pen holder for rotating the pen holder from one writing station to another.

2. An apparatus as claimed in claim 1, wherein said penholder comprises a member which carries said writing tip and has a cam surface and which is pivotally mounted to said gantry for movement between said writing stations; and wherein said means for rotating the penholder comprises the cam surface of said member and abutment means on said gantry for engaging said cam surface to rotate the member between said writing sections.

3. An apparatus as claimed in claim 2, wherein said abutment means comprises two actuator pins located one at each end of the gantry.

4. An apparatus as claimed in claim 1 wherein said penholder comprises a member rotatably mounted to said gantry and carrying said writing tips on its periphery and a cam surface arranged thereon for rotation with said member; and wherein said means for rotating the pen holder comprise said cam surface and an actuator element attached to said apparatus in fixed relation to said second axis for engaging said cam surface to rotate said member between respective writing stations.

5. An apparatus as claimed in claim 4 wherein said actuator element is a resiliently biassed pawl and said cam surface is provided by a ratchet mounted to and coaxially with said member, said ratchet having teeth which are engagable by the pawl, disengagement being effected by relative motion between the pawl and penholder causing the member to rotate to a successive writing station.

6. An apparatus as claimed in claim 5, wherein said penholder has a guide surface; and further comprising a receptor member mounted to said apparatus fixed in relation to said second axis and having walls defining a guide slot in which the pawl is mounted and which is provided to co-operate with the guide surface of the penholder to locate said pawl for engagement with a tooth of the ratchet.

7. An apparatus as claimed in claim 5 wherein detent means are provided on the penholder to receive said member against rotation when in each of said writing station.

8. An apparatus as claimed in claim 5 further comprising a penholder mounting mounted on the gantry and movable with respect to the gantry along said second axis, said member being removably and rotatably mounted thereon.

* * * * *